(12) United States Patent
Goldfarb et al.

(10) Patent No.: US 11,298,713 B2
(45) Date of Patent: Apr. 12, 2022

(54) DEVICE FOR DISPENSING ESSENTIAL OIL OR TINCTURE

(71) Applicants: Andrew S. Goldfarb, New York, NY (US); Joshua Goldfarb, New York, NY (US); Pepin Gelardi, Brooklyn, NY (US); Joseph Antonio Gonzalez, Brooklyn, NY (US); Emma Pearl Willmer-Shiles, Brooklyn, NY (US)

(72) Inventors: Andrew S. Goldfarb, New York, NY (US); Joshua Goldfarb, New York, NY (US); Pepin Gelardi, Brooklyn, NY (US); Joseph Antonio Gonzalez, Brooklyn, NY (US); Emma Pearl Willmer-Shiles, Brooklyn, NY (US)

(73) Assignee: TYNC, LLC, New Rochelle, NY (US)

( * ) Notice: Subject to any disclaimer, the term of this patent is extended or adjusted under 35 U.S.C. 154(b) by 0 days.

(21) Appl. No.: 16/686,048

(22) Filed: Nov. 15, 2019

(65) Prior Publication Data

US 2020/0156096 A1 May 21, 2020

Related U.S. Application Data

(60) Provisional application No. 62/768,276, filed on Nov. 16, 2018.

(51) Int. Cl.
*B05B 11/00* (2006.01)
*G01F 11/04* (2006.01)
*B65D 83/00* (2006.01)

(52) U.S. Cl.
CPC .... *B05B 11/3043* (2013.01); *B05B 11/00416* (2018.08); *B65D 83/0022* (2013.01); *G01F 11/04* (2013.01)

(58) Field of Classification Search
CPC .......... B05B 11/3043; B05B 11/00416; B65D 83/0022; G01F 11/04
See application file for complete search history.

(56) References Cited

U.S. PATENT DOCUMENTS 4,892,427 A * 1/1990 Ford .................... A45D 34/042
222/391
5,304,152 A 4/1994 Sams
(Continued)

FOREIGN PATENT DOCUMENTS

WO WO 2015/077456 5/2015

*Primary Examiner* — Frederick C Nicolas

(57) ABSTRACT

A portable liquid dispensing device which includes a liquid cartridge containing a prefilled desired liquid supported within the dispensing device. A dispensing mechanism is positioned within the device for engagement with the liquid cartridge for dispensing a desired amount of liquid from the liquid cartridge to an outlet exiting the device. An actuator button is also provided for actuating the dispensing mechanism and dispensing the desired amount of liquid through the outlet of the dispensing device. The dispensing mechanism includes a central shaft with a first end engaged with the actuator button, a second end is positioned adjacent the outlet, and a plunger assembly is supported on the central shaft intermediate the first and second ends for substantially sealed engagement with an internal surface of the liquid cartridge and central shaft to move the plunger assembly and liquid toward the outlet upon actuation of the actuator button. Upon deactivation of the actuator button, the central shaft slidably moves or retracts through the plunger assembly, without moving the plunger assembly.

15 Claims, 8 Drawing Sheets

(56) References Cited

U.S. PATENT DOCUMENTS

| | | | |
|---|---|---|---|
| 5,340,227 A * | 8/1994 | D'Andrade | B05B 11/0035 |
| | | | 401/195 |
| 5,725,508 A | 3/1998 | Chanoch et al. | |
| 6,235,004 B1 | 5/2001 | Steenfeldt-Jensen et al. | |
| 9,770,563 B1 | 9/2017 | Freeman et al. | |
| 10,195,345 B2 * | 2/2019 | Senior | A61M 5/24 |
| 10,195,354 B2 * | 2/2019 | Jones | A61M 5/24 |
| 2005/0004529 A1 | 1/2005 | Veasey et al. | |
| 2005/0165363 A1 | 7/2005 | Judson et al. | |
| 2008/0188813 A1 | 8/2008 | Miller et al. | |
| 2011/0017406 A1 | 1/2011 | Schultz et al. | |

* cited by examiner

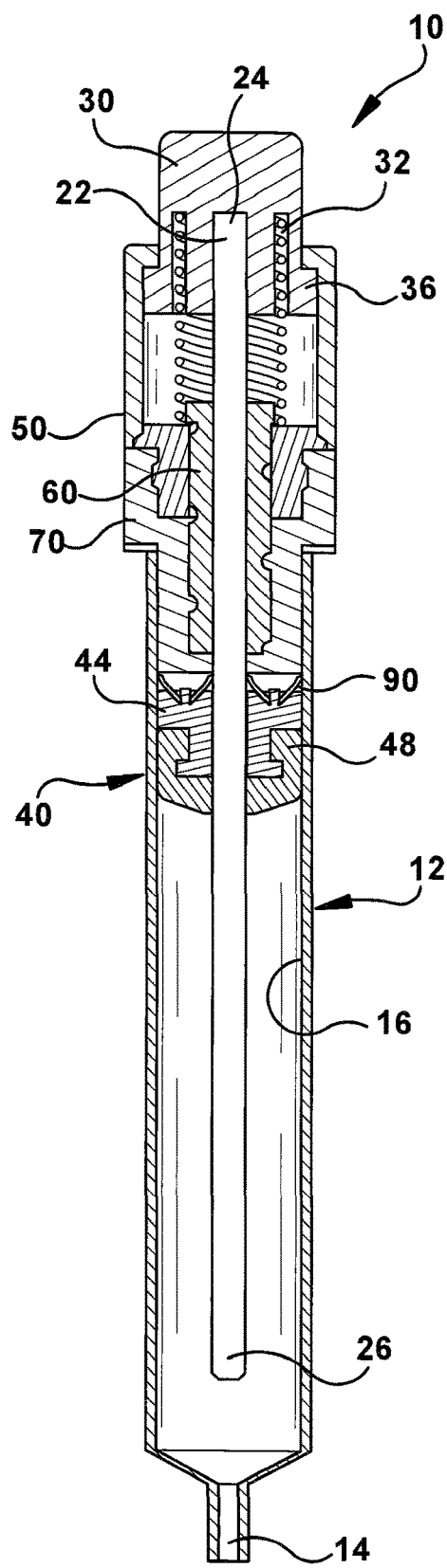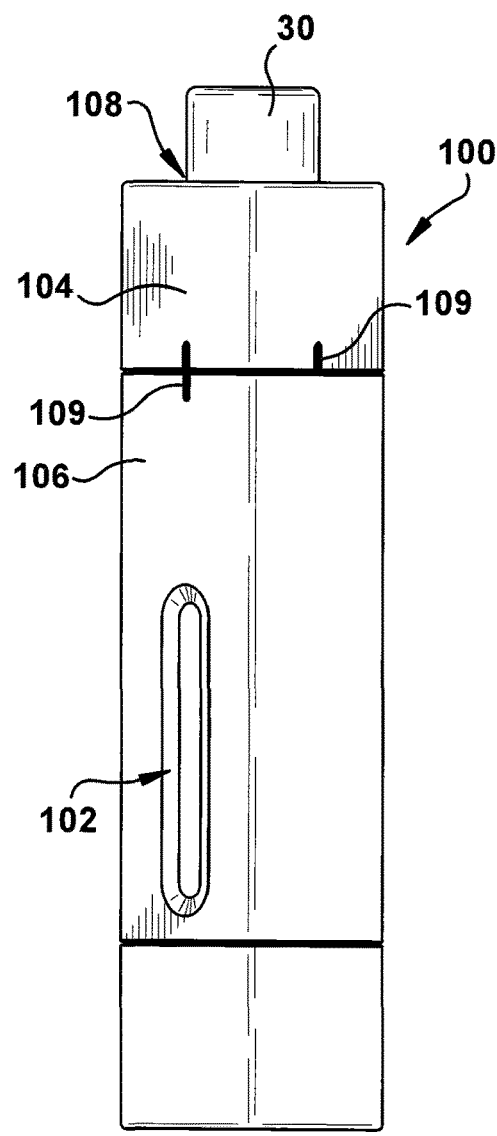
Fig. 1
Fig. 2

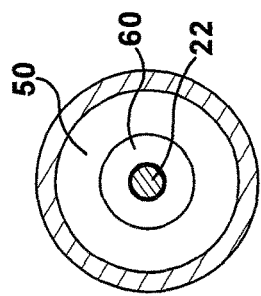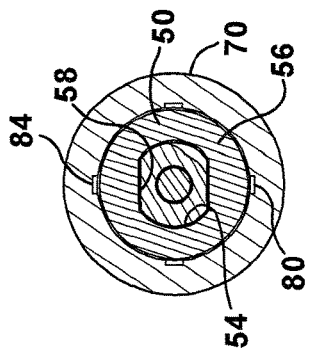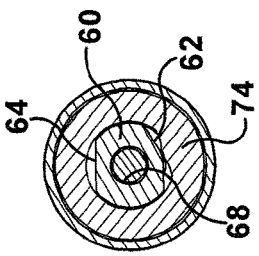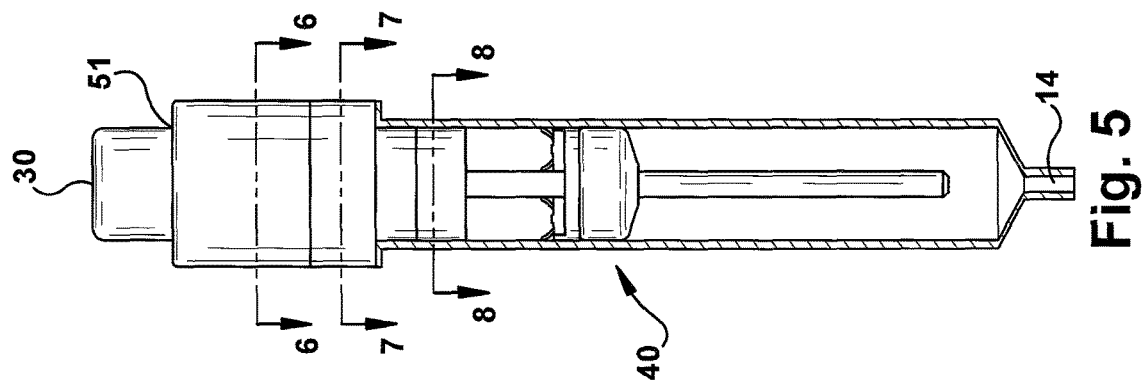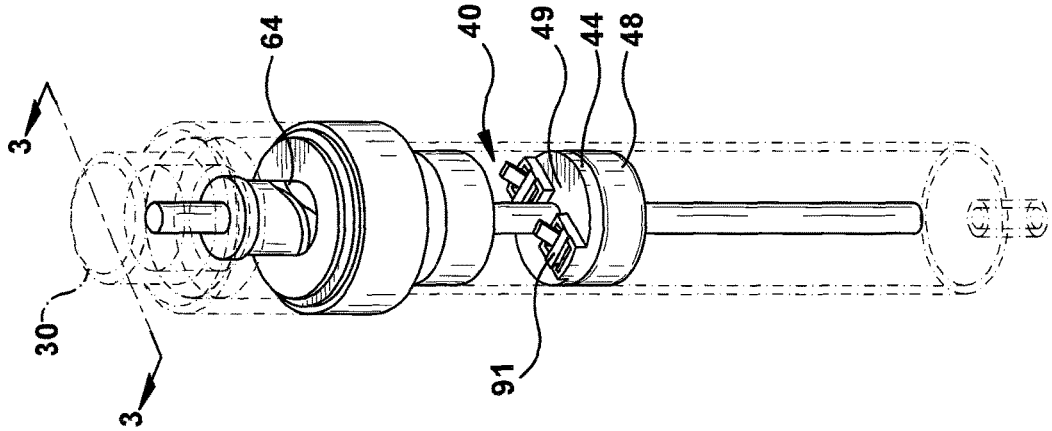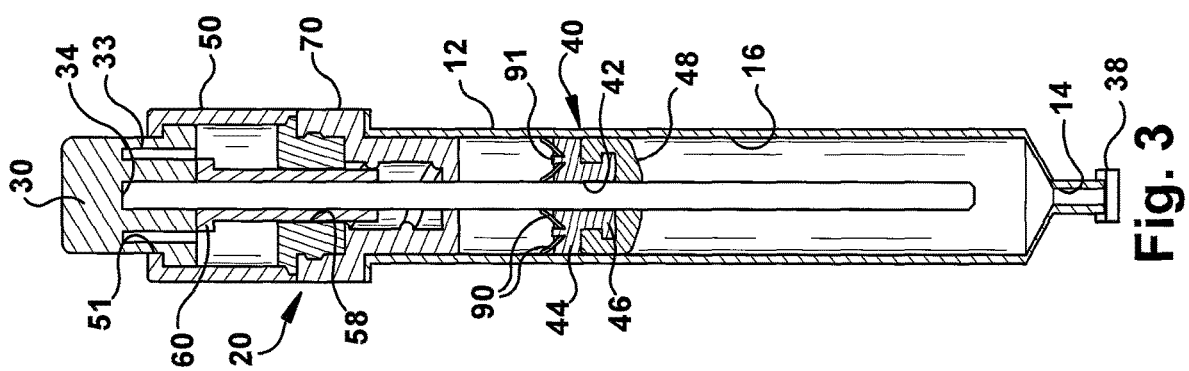

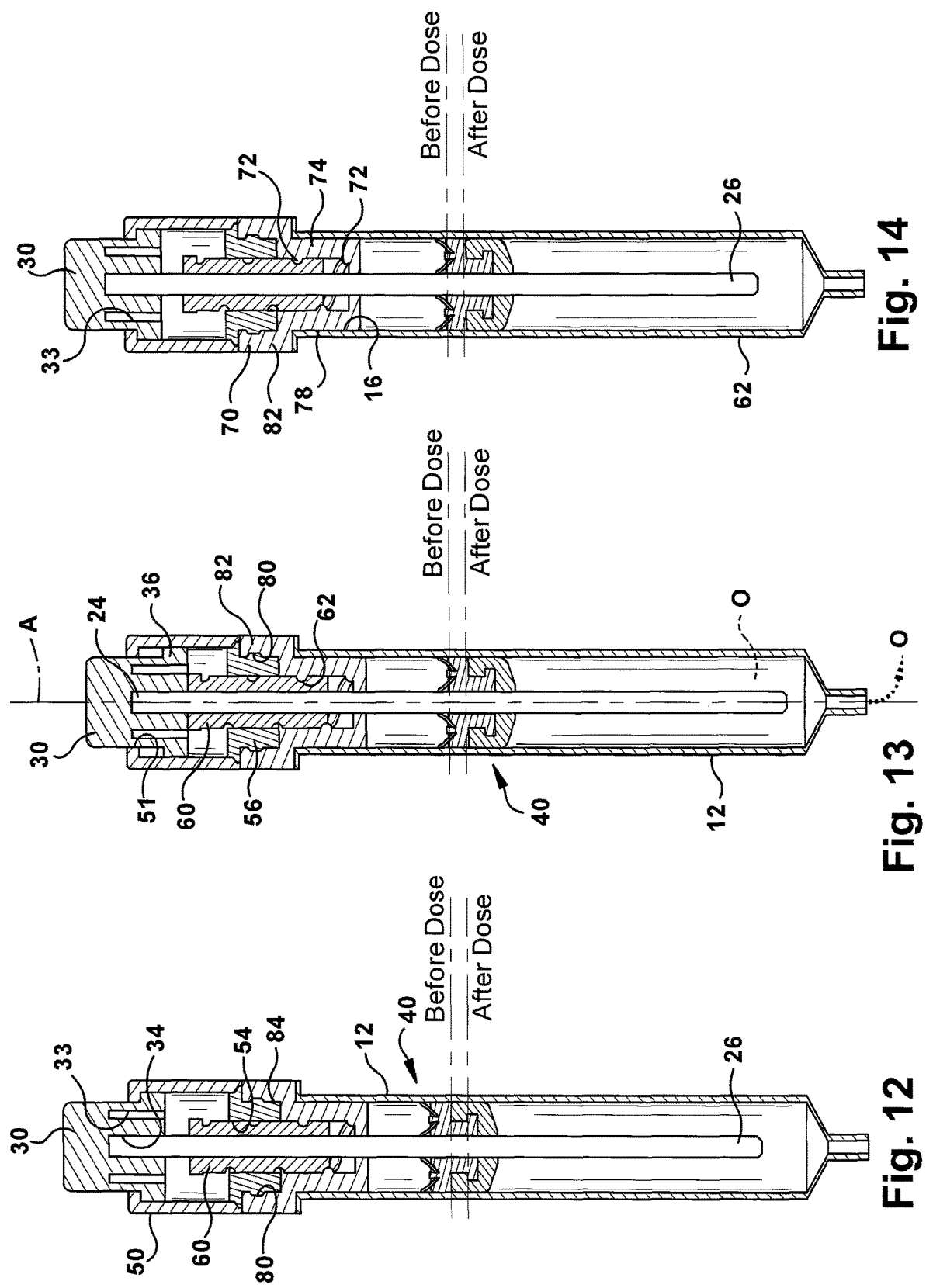

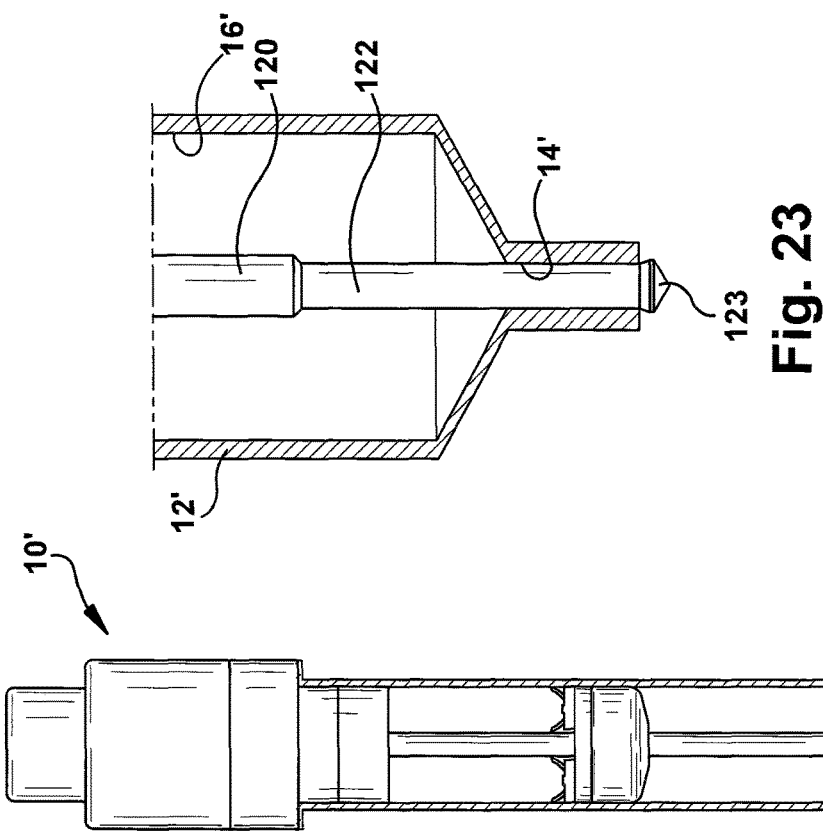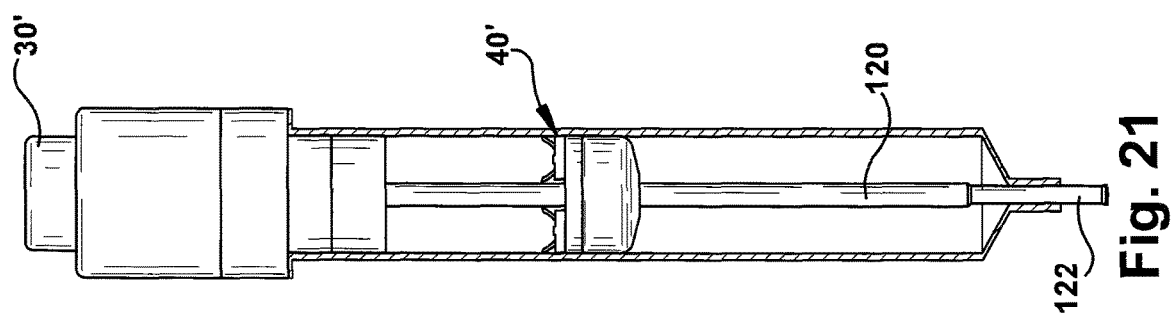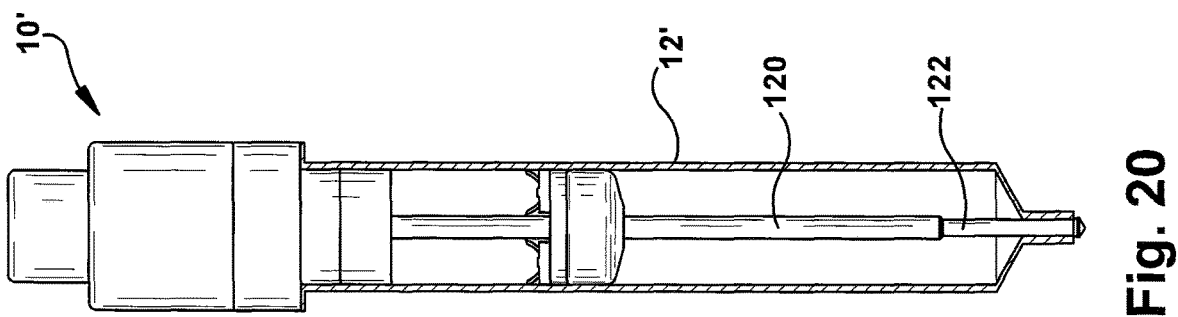

DEVICE FOR DISPENSING ESSENTIAL OIL OR TINCTURE

CROSS REFERENCE TO RELATED APPLICATIONS

This application claims priority to and the benefit of U.S. Patent Application No. 62/768,276 filed Nov. 16, 2018, the entire contents of which is incorporated herein by reference.

FIELD OF INVENTION

The present application relates to a device for dispensing extracts, essential oils or tinctures, specifically to an improved mechanical dispensing device, and to such devices which may include sensors and software for monitoring, storing and communicating information regarding liquid essential oils, including *cannabis*-related products, dispensed from the device to multiple interconnected electronic devices via machine-to-machine communications, commonly referred to as the Internet of Things ("IoT").

BACKGROUND

Devices used to heat, vaporize or dispense a liquid form of a plant material, such as tobacco, herbs or other medicinal plants, are becoming more common among users. Such users may generally prefer to vaporize or ingest the essential oils, extracts, concentrates or tinctures of plant material over smoking or burning such material. Burning or smoking the materials is less desirable, as it involves the inhalation of many toxic and carcinogenic by-products which may be released during the burning process. Vaporizing also has negative health connotations, is also less discrete than the ingestion of essential oils, and may not result in reliable dosing of the plant material, since each individual may inhale vaporized material in different quantities.

The use of conventional pipettes or bottles with "droppers" is a commonly available container for dispensing liquid essential oils for ingestion. While the simplicity of droppers makes their use inexpensive and easy to explain to patients or users, the amount of liquid dispensed can also be unreliable, either due to the number of drops dispensed, or the inability to recall or remember the doses used. Additionally, as more and more governments legalize the use of cannabidiol ("CBD") oil, both for medical and recreational uses, there is an increased desire for more exact dosages in a variety of available product potencies. Additionally, there is a desire to maintain a record of, and to be able to clearly communicate, the amount of liquid dispensed by the device, as well as to enable the device to electronically interface with other connected electronic devices using IoT functionality.

SUMMARY

The present application provides a device that dispenses desired small milligram and milliliter amounts of liquid of any variety. The liquid may be dispensed in either drops or streams. The use of the present device more efficiently distributes a measured dose conveniently, more discreetly, and in a stylish way. Additionally, the device also potentially enables recording statistics regarding the amounts of liquid dispensed for medical or recreational use.

The device is a portable mechanical device, preferably a handheld device larger than the size of an ink pen or conventional butane lighter, and is convenient for carrying. By activating a push button located on a top surface of the device, the internal hardware distributes the desired amount of liquid from an exit opening in the bottom of the device. The internal hardware includes a central shaft operating a plunger within a sealed container of the liquid to be dispensed, and moves the desired and selected amount of fluid out of the exit opening. While the device may be of a size to dispense multiple doses of liquid, a single use device is also possible. The multi-dose liquid container or cartridge may include at least 10 ml of liquid, which is able to be dispensed in doses ranging from 0.1 ml to 1.0 ml or higher, including 0.5 ml or other doses. Such multi-dose containers or vials may include 10 to 20 doses. A single dose disposable device is smaller in size and contains a smaller dose, for example 0.5 or 1.0 ml of liquid.

Since the dispensing device is of a size that may be conveniently placed within a bag, purse or pocket, an end cap or safety position or switch may also be provided on the device, such that when the device is placed into a larger container or pocket it may be sealed or locked to avoid accidental activation and does not miss fire or leak.

The dispensing device preferably uses cartridges which are pre-filled with a desired liquid to be dispensed. When a cartridge is empty, a new removable cartridge may be loaded or the cartridge may be refilled with the desired liquid. Thus, the cartridge may be either a removable and disposable container or a reusable container, depending on the desired embodiment. Alternatively, the entire dispensing device may be disposable, such that the dispensing device is provided with a top and lower housing with a non-removable or fixed container or cartridge containing the desired liquid, which may be entirely disposed of when the device is empty. Still further, additional structure is provided on or in connection with the device, in order to select the desired amount or measurement of the dose of liquid being dispensed by moving structure provided on the device to the desired dose position.

When the device is optionally a portable electronic device, application of a push button may additionally activate software for interfacing with sensors to detect the amount of liquid dispensed. By sensing and storing information regarding the amount of liquid dispensed from the device, software within and interconnected with the device enables a user to better manage their use of the liquids dispensed. In this embodiment, the dispensing device is preferably able to provide Internet of Things functionality. As a result, where the device is a battery operated dispensing device, it may connect to a "Smart" or WiFi connected cellular phone or computer via Bluetooth® technology. A computer program or cellular phone application provided on the user's computer or phone will store a variety of information sensed based upon use of the device, and also enable the user to determine how much liquid remains within the cartridge installed within the dispensing device.

The use of a computer program application provided on either a phone or computer also enables the user to set the amount of liquid desired to be dispensed with a single press of an electronic button provided within the computer program application, or by using the operational buttons on the device. As mentioned, by sensing and storing information regarding the amount of liquid dispensed from the device, a user can track the history of their liquid distribution over a span of time. The history of use can be shared at the instruction of the user with a health care provider.

BRIEF DESCRIPTION OF THE DRAWINGS

FIG. 1 illustrates a cutaway internal side view of the dispensing device of the present application, taken along the line 3-3 of FIG. 4, but where a lead screw is rotated to a fully open position or largest volume setting.

FIG. 2 illustrates a schematic side view of the external case for the device of FIG. 1.

FIG. 3 illustrates a cutaway internal side view of the dispensing device taken along the line 3-3 of FIG. 4, but where a lead screw is rotated to a fully locked or closed position through the flats of the lead screw.

FIG. 4 schematically illustrates an internal and external shaded perspective view of the dispensing device of the present application.

FIG. 5 schematically illustrates an internal and external partially shaded side view of the dispensing device of FIG. 4.

FIG. 6 illustrates a cutaway view of the top housing taken along the line 6-6 of FIG. 5.

FIG. 7 illustrates a cutaway upper view of the lower housing taken along the line 7-7 of FIG. 5.

FIG. 8 illustrates a cutaway lower view of the lower housing taken along the line 8-8 of FIG. 5.

FIGS. 12 to 14 schematically illustrate operation of the dispensing device to dispense an intermediate volume of liquid, where in FIG. 12 the lead screw is positioned in a volume setting spaced closer to the actuating button, to permit less movement of the actuating button and dispensing of an intermediate volume of liquid, which actuating button is shown depressed in FIG. 13 in order to drive the central shaft and plunger assembly downward within the fluid cartridge to move an intermediate volume of fluid through the outlet to exit the dispensing device, and which central shaft is then retracted through the plunger assembly after deactivation of the actuating button as shown in FIG. 14, leaving the plunger assembly in the new position. FIG. 14 also provides an indication of the plunger assembly movement between FIGS. 12 to 14.

FIG. 15 is taken along a cut line similar to the line 1-1 shown in FIG. 4, and FIG. 16 is taken along a cut line similar to the line 3-3 shown in FIG. 4.

FIG. 18 shows the end cap removed for fluid to be provided into the container with the plunger assembly retracted, and FIG. 19 shows the end cap replaced to close the fluid container after filling.

FIGS. 20 to 22 illustrate an internal and external partially shaded side view of the device of the present application, shown in FIG. 20 prior to dispensing fluid from the fluid cartridge via an elongate central shaft engaged through the outlet with a cap sealing the outlet, where FIG. 21 shows the actuation button depressed and the shaft and cap moved away from the outlet to permit fluid flow, and FIG. 22 shows the shaft and cap returning to closed and sealed position after the actuation button is released.

FIG. 23 illustrates an enlarged cutaway view of the fluid cartridge showing the elongate central shaft and cap closing and sealing the outlet as in FIGS. 20 and 22.

DETAILED DESCRIPTION

Figure 11:
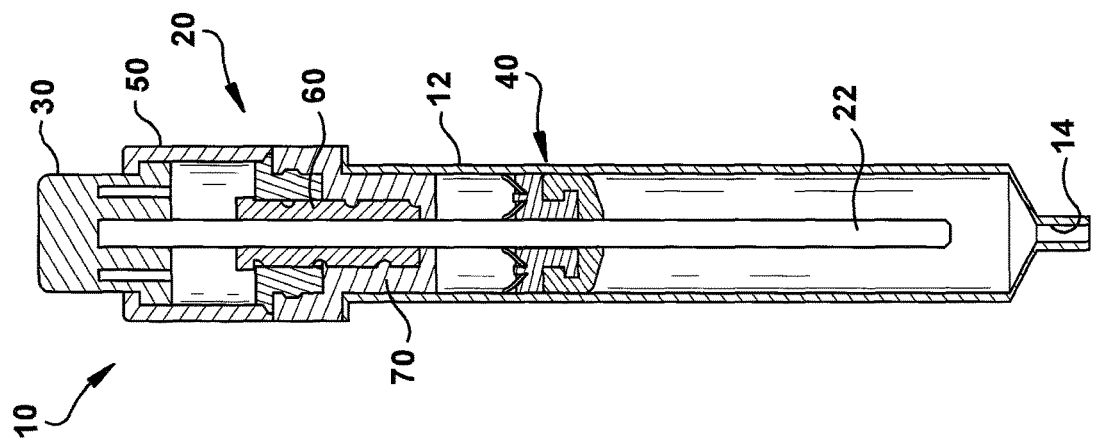
FIGS. 9 to 11 schematically illustrate operation of the dispensing device to dispense the largest volume of liquid, where in FIG. 9 the lead screw is positioned in a volume setting spaced far from the actuating button, to enable the most or longest movement of the actuating button, which is shown depressed in FIG. 10 in order to drive the central shaft and plunger assembly downward within the fluid cartridge to move the largest dose of fluid through the outlet to exit the dispensing device, and which central shaft is then retracted through the plunger assembly to return to initial position after deactivation of the actuating button as shown in FIG. 11, leaving the plunger assembly in the new position closer to the outlet.

The present application provides an improved portable device 10 for dispensing essential oils or tinctures. A general cross-sectional view of one embodiment of the liquid dispensing device 10 is shown in FIG. 1. Aspects of the various embodiments of the improved liquid dispensing device described herein which are similar will be not be distinguished in detail, other than by the use of a prime designation in connection with later described embodiments.

As shown in FIG. 4, the portable liquid dispensing device includes a liquid cartridge or container 12 supported with the dispensing device and containing a prefilled desired liquid O. A dispensing mechanism 20 is positioned for engagement with and within the liquid cartridge 12 for dispensing a desired amount of liquid from the liquid cartridge through an outlet 14 where the liquid O exits the device. An actuator button 30 is used for actuating the dispensing mechanism and dispensing the desired amount of liquid through the outlet 14. As shown schematically in FIGS. 1 and 3, the actuator button 30 is biased by a spring 32, which is engaged within a slot 33 between the button 30 and the dispensing mechanism 20 to bias the button to a position in which the dispensing device is closed. While it is understood that the surface tension of the fluid O within the cartridge 12 generally prevents fluid from exiting the outlet 14 unless under pressure from the plunger assembly 40, as shown in FIG. 3, a removable cap 38 covering the outlet may also be provided where desired.

The dispensing mechanism 20, shown in various stages of operation in FIGS. 3 to 13, includes a central shaft 22 having a central axis A which is aligned with a central axis CA of the fluid cartridge 12. A first end 24 of the central shaft 22 is engaged and secured within a bottom opening 34 in the actuator button 30. A second end 26 of the central shaft 22 is positioned adjacent the outlet 14. A plunger assembly 40 is also included and is supported on the central shaft 22 intermediate the first and second ends 24, 26 for engagement with and along the central shaft 22 and an internal surface 16 of the liquid cartridge 12. To move the plunger assembly and liquid toward the outlet 14 and dispense fluid, the actuator button 30 is depressed to slidably move the central shaft and the plunger assembly within the fluid cartridge 12. Deactivation of the actuator button 30 returns or retracts the central shaft 22 through an opening 42 in the plunger assembly 40 under action of the spring 32, while the plunger assembly does not move during retraction.

The movement or plunger travel of the dispensing mechanism 20, including the central shaft 22 and plunger assembly 40, determines the amount of fluid volume dispensed through the outlet 14. The dispensing mechanism 20 in the embodiment of FIGS. 1 to 8 includes a top housing 50, a lead screw 60 and a lower housing 70. The top housing 50 provides for supporting captured engagement of the actuator button by a bottom lip 36 of the button at a button opening 51 on one open end of the top housing. The top housing 50 also has an inner wall 54 for engagement with the lead screw 60. A portion 56 of the inner wall 54 of the top housing 50 includes opposing flat stop surfaces 58 to restrict movement of the lead screw 60 with respect to the top housing 50, as shown in FIG. 6.

The lower housing 70 includes male threads 72 formed on a narrow inner wall portion 74, an external surface 78 of which is secured to the internal surface 16 of the fluid cartridge 12, either by a conventional adhesive material or a secure press fit engagement. The lower housing also includes spaced openings 80 formed in an expanded diameter inner wall portion 82 for adjustable engagement with detents 84 in an outer wall 86 of the top housing 50 for adjustable and rotating movement of the lower housing 70 with respect to the top housing along the lead screw 60 to a desired volume dispensing position. The detents 84 and openings 80 are shown in FIG. 7. By rotating the top housing, to the desired position, the lead screw 60 determines the travel of the plunger assembly and amount of liquid dispensed.

Figure 9:
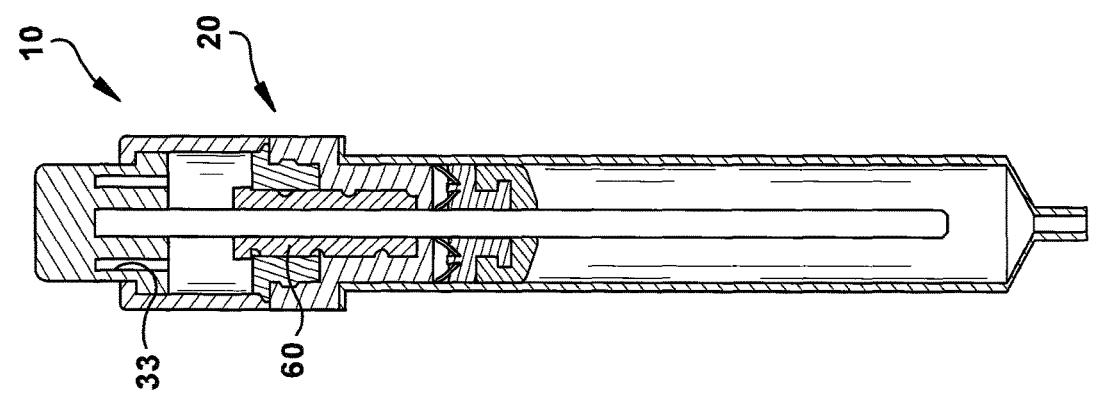
Figure 16:
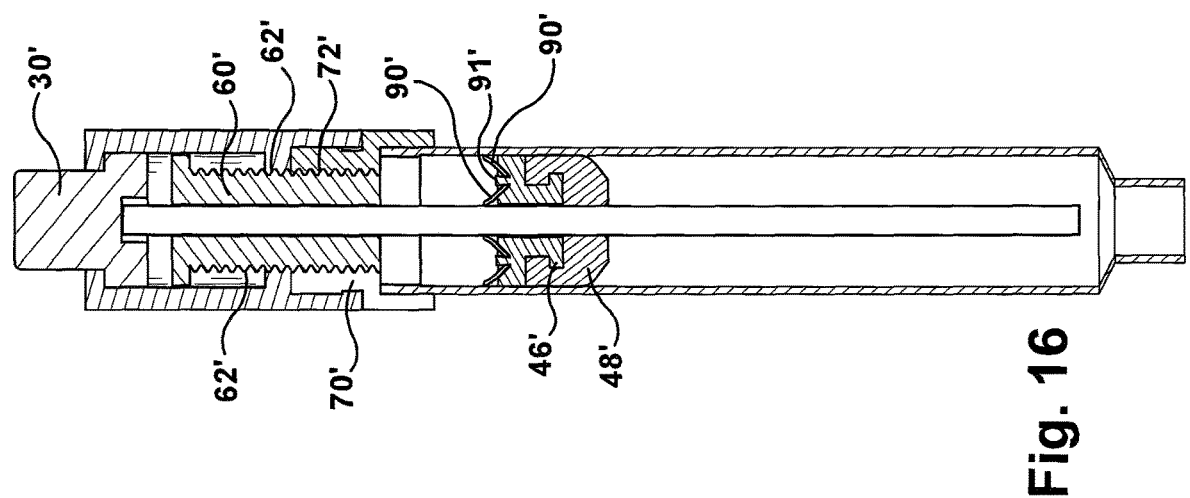
FIGS. 15 and 16 illustrate an alternate cutaway embodiment of the lead screw, where
Figure 15:
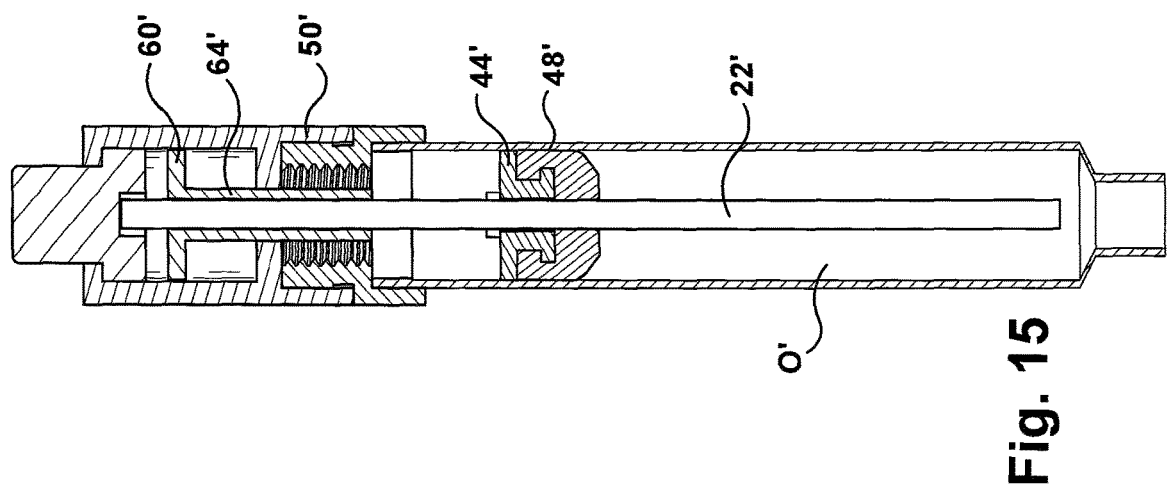

The lead screw 60 is provided with female threads 62 and opposing flat surfaces 64, shown in FIGS. 7-8, formed in its outer wall for fixed and mating engagement with the top housing. The female threads 62 enable threaded rotating engagement with the threads 72 in the lower housing 70. The inner wall 54 of the top housing 50 and narrow inner wall portion 74 of the lower housing 74 abut, as shown in FIGS. 3 and 9, and are aligned to capture the lead screw 60 within the top and lower housings, as in FIG. 7. The lead screw has a central opening 68 for sliding engagement along the central shaft 22. The reciprocating lead screw threads 62 and lower housing threads 72 drive the lead screw up and down between positions when rotated with the top housing to align engagement between the detents 84 and spaced openings 80. An alternate embodiment of the threaded lead screw 60' is shown in FIG. 15-16.

In the preferred embodiment, illustrated in FIG. 7, four (4) detents 84 and mating openings 80 are positioned at equally spaced increments around the top and lower housings, respectively, shown in FIG. 7, to provide at least four (4) positions or volumetric settings for dispensing liquid O. While more volumetric settings may be provided, the four (4) settings included enable a locked position, where no movement of the lead screw is permitted, as well as 3 volumetric settings, to dispense amounts ranging between 0.5 ml and 1.0 ml or higher. In a still further embodiment, the liquid dispensing device may be a single dose fixed applicator, where only one volume of liquid, for example 1.0 ml or less, is dispensed, after which the entire device is disposed of.

The plunger assembly 40 is also supported on the central shaft 22, and includes a plunger driver 44 having a central opening 42 for sliding engagement along the central shaft 22. A lower support shelf 46 on the plunger driver 44 supports and is secured, by conventional methods such as an adhesive, to a seal member 48 for substantially sealed and slidable engagement with the central shaft 22 and the internal surface 16 of the liquid cartridge 12. The seal member is preferably a rubber materials or a thermoplastic rubber material (TPE).

In the preferred embodiment of FIG. 4, the top surface 49 of the plunger driver 44 has rigid clips 90 secured to the top surface 49 to engage the central shaft 22 and the internal surface 16 of the liquid cartridge 12 to move the central shaft 22 and plunger assembly 40 toward the outlet during actuation of the actuator button. The rigid clips may be of any appropriate material, such as steel or other hard plastic, to engage the central shaft when moving the plunger driver and seal member toward the outlet 14, and to permit retraction of the central shaft past the rigid clips 90 (and through the plunger assembly) following deactivation of the actuator button. The clips may be two strips of bent metal secured under strips 91 in the top surface, or single strips secured by adhesive or molded in position.

Figure 10:
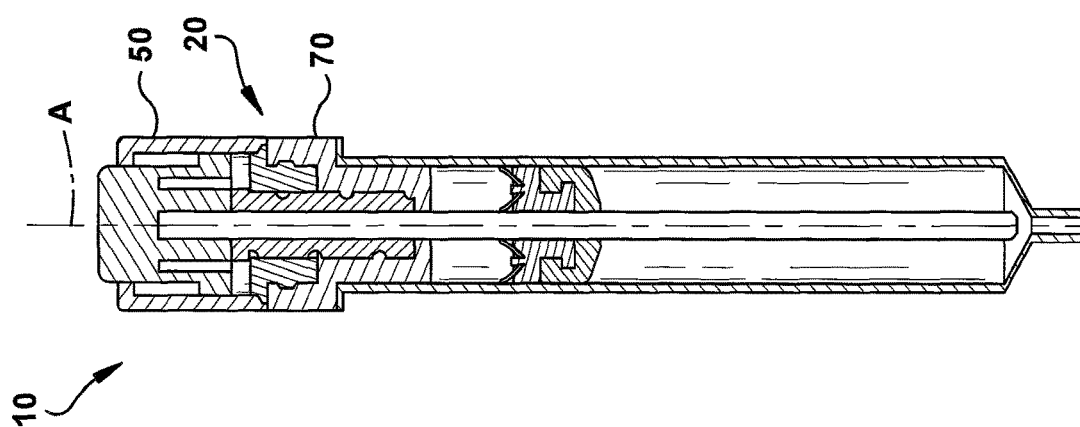

As described, to dispense the desired amount of liquid from the device, the top or upper housing 50 is rotated to one of several volumetric positions. The movement of the top housing 50 rotates the interconnected lead screw 60 within the lower housing 70, to move the lead screw to the desired volume dispensing position, and positions the lead screw to permit travel of the central shaft 22 and plunger assembly 40 for a predetermined travel distance following actuation of the actuator button 30. As shown in FIGS. 9 to 11, the lead screw 60 is in the lowest position within the lower housing, such that travel of the central shaft and plunger assembly is the longest, to dispense the largest volume of liquid, for example 1.0 ml. In FIGS. 12 to 14, the position of the lead screw 70 permits an intermediate dose of fluid to be dispensed. In FIG. 3, the lead screw 70 is positioned to block movement of the actuator button, or in locked position. A still further fourth volumetric position is enabled in the preferred embodiment, in which the lead screw 70 is provided in a position between the positions shown in FIG. 3 and in FIG. 12.

In another embodiment of the device, an external case 100 is provided to enclose the device 10 and includes a viewing window 102 for visually determining the amount of liquid remaining within the liquid cartridge. The window 102 may be provided as an opening uncovered by any transparent material, as shown in FIG. 2, or as a covered opening with a transparent polymer or glass material covering the opening.

The external case 100 for enclosing and protecting the device 10 is an interconnected two-piece housing 104, 106 having an opening 108 in the top piece 104 for accessing the actuator button 30. The top piece 104 of the external case 100 is engaged with and surrounds the top housing 50, and is rotatable with respect to the interconnected lower piece 106, for similarly rotating with the top housing 50 with respect to the lower housing 70 to the desired volumetric position. Volumetric markings or indicia 109 are provided on both the top and lower pieces 104, 106. The top piece 106 includes 4 markings, each marking representing one of the available settings. The lower piece 106 has a single marking. When the marking for the desired setting on the top piece 104 is aligned with the single marking on the lower piece 106, as shown in FIG. 2, the device 10 is positioned to dispense the specific selected desired volume of liquid. Where no external case is provided with the device 10, additional volumetric indicia may also be provided on the external surface of the top and lower housings 50, 70 to indicate their rotation to the desired volume setting.

Figure 19:
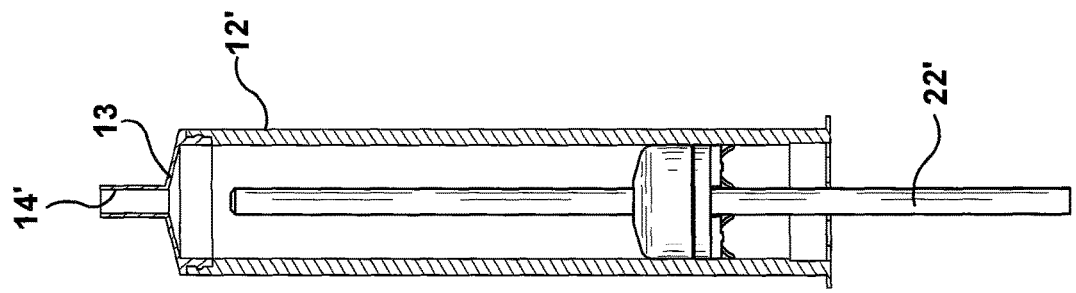
FIGS. 18 and 19 illustrate an internal and external partially shaded side view of a refillable fluid container and plunger assembly, where
Figure 18:
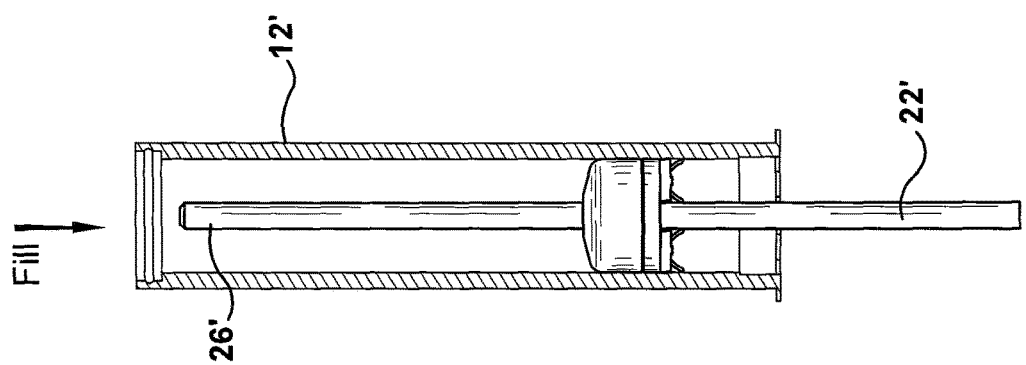
Figure 17:
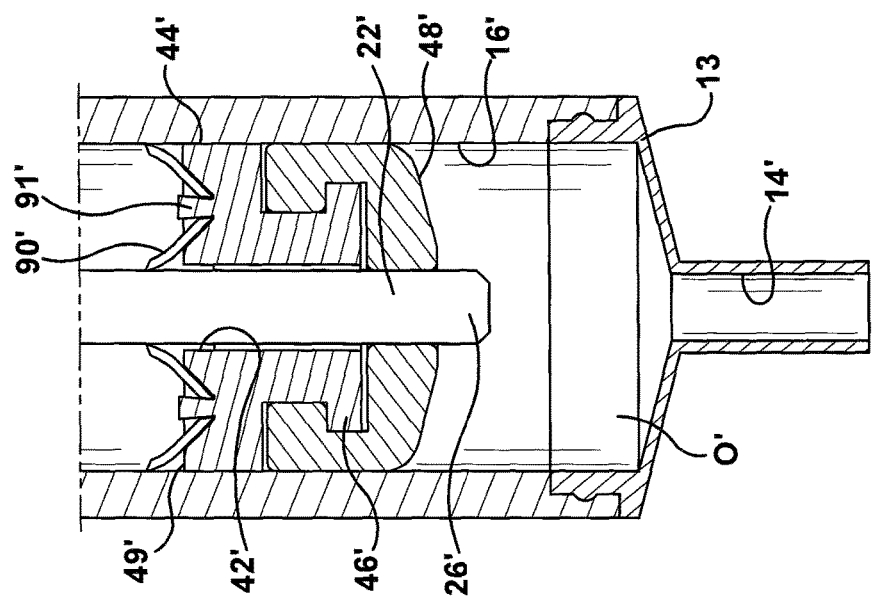
FIG. 17 illustrates a close-up center cutaway side view of an alternate embodiment of a removable end cap and plunger assembly.

As shown in FIGS. 17 to 19, the device 10' may be provided with a liquid cartridge or container 12' which is refillable. In the refillable embodiment, a removable end cap 13 may be secured, either by a snap on, threaded or other conventional engagement, with an end of the liquid cartridge 12' adjacent the second end 26' of the central shaft 22', and includes the outlet 14' for fluid exiting the device. The material of the liquid cartridge in the various embodiments may be any appropriate material, such as a polymer or glass, and is preferably transparent or sufficiently translucent to enable a visual determination of the amount of liquid remaining within the cartridge 12, 12', 12".

In yet another embodiment in FIGS. 20 to 23 for closing the liquid cartridge 12', the central shaft 22' has two diameters, one diameter portion 120 is engaged with the actuator button 30', lead screw 60' and plunger assembly 40', and the second and narrower diameter portion 122 is of a size for sliding engagement within the outlet 14'. The second diameter portion 122, while engaged through the outlet, does not prevent a dose of liquid from exiting the device through the outlet 14 when the actuator button is depressed as shown in FIG. 21. A sealing tip 123, preferably of a rubber or TPE material, is provided on the narrower diameter portion 122 of the central shaft 22' to engage and seal the outlet 14' during retraction of the central shaft, as in FIGS. 22-23.

Figure 24:
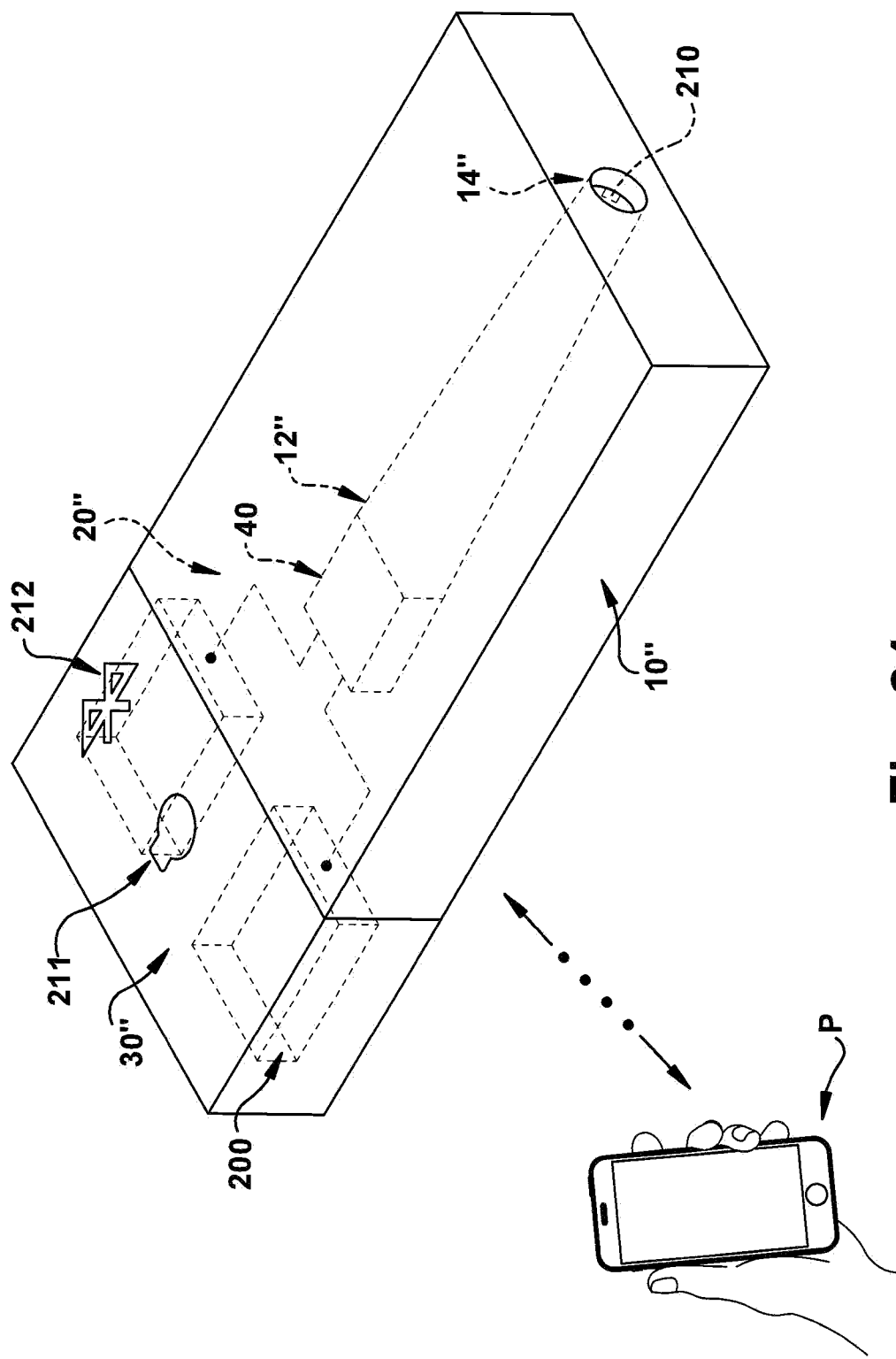
FIG. 24 schematically illustrates a partial internal and external view of an alternate embodiment of the dispensing device having a power source, electronic sensors and interconnected Bluetooth technology, to monitor and store data regarding liquid dispensed from the liquid container via a liquid outlet.

In a still further embodiment schematically illustrated in FIG. 24, a portable electronic liquid dispensing device 10" is shown as including a power supply 200 supported within the dispensing device, a removable liquid cartridge 12" containing a pre-filled desired liquid material supported within the dispensing device, and a dispensing mechanism 20" positioned for engagement with the removable liquid cartridge for dispensing a desired amount of liquid material from the liquid cartridge to an outlet exiting the device. An actuator button 30" is shown for actuating the dispensing mechanism for dispensing the desired amount of liquid material through the outlet 14" of the dispensing device. A sensor 210 is positioned within the dispensing device for sensing and electronically storing data concerning the amount and timing of liquid material dispensed from the outlet.

The dispensing device of FIG. 24 includes software, hardware and firmware control systems 211 well known to those of ordinary skill in the art for storing the desired amounts or doses of liquid to be dispensed from the liquid cartridge, the sensed amounts of liquid material dispensed from the outlet, and is Bluetooth enabled technology 212 for interfacing with a cellular phone or computer P. The device 10" in electronic communication with control systems and software 211 may provide for potential activation of the dispensing mechanism, for modification of the desired amounts of any doses to be dispensed, and the sensed amounts of liquid material dispensed.

Although the portable liquid dispensing device of the present application has been described in detail sufficient for one of ordinary skill in the art to practice the invention, it should be understood that various changes, substitutions and alterations may be made without departing from the spirit or scope of the device as defined in the attached claims. Moreover, the scope of the present device is not intended to be limited to the specific embodiments described here, which are provided by way of example. As one of ordinary skill in the art will readily appreciate from the disclosure of the present device and its embodiments, other components and means presently existing or later to be developed that perform substantially the same function to achieve substantially the same result as those of the corresponding embodiments described here, may be utilized according to the present application. Accordingly, the appended claims are intended to include within their scope such other components or means.

We claim:

1. A portable liquid dispensing device comprising:
   a liquid cartridge containing a prefilled desired liquid supported within the dispensing device;
   a dispensing mechanism positioned for engagement with the liquid cartridge for dispensing a desired amount of liquid from the liquid cartridge to an outlet exiting the device;
   an actuator button for actuating the dispensing mechanism for dispensing the desired amount of liquid through the outlet of the dispensing device; and
   wherein the dispensing mechanism further comprises a central shaft with a central axis aligned with a central axis of the portable liquid dispensing device, a first end of the central shaft is engaged with the actuator button, a second end of the central shaft is positioned adjacent the outlet, and a plunger assembly supported on the central shaft comprising a plunger driver having a central opening engaged with the central shaft and a seal member supported on the central shaft intermediate the first and second ends for engagement with an internal surface of the liquid cartridge and with the central shaft, and a top surface having clips to engage the central shaft to slidably move the central shaft and plunger assembly toward the outlet during actuation of the actuator button and permit retraction of the central shaft through the plunger assembly following deactivation of the actuator button, and wherein the second end of the central shaft is sized for sliding engagement with an internal surface of the outlet to engage and seal the outlet.

2. The portable liquid dispensing device of claim 1 wherein the dispensing mechanism further includes a top housing for supporting engagement with the actuator button on one end, an inner wall of the top housing engages an outer wall of a lead screw slidably supported on the central shaft, and a portion of the inner wall of the top housing includes a flat stop surface to restrict movement of the lead screw with respect to the top housing.

3. The portable liquid dispensing device of claim 2 wherein the dispensing mechanism further includes a lower housing having male threads formed on a narrow inner wall portion of the lower housing for mating engagement with the female threads formed on the outer wall of the lead screw, and the inner wall of the top housing and inner wall of the lower housing are aligned to capture the lead screw within the top and lower housings.

4. The portable liquid dispensing device of claim 3 wherein the lower housing further includes spaced openings in an expanded diameter inner wall portion for adjustable engagement with detents in an outer wall of the top housing for adjustable movement of the lower housing with respect to the top housing to a desired volume dispensing position.

5. The portable liquid dispensing device of claim 4, wherein rotation of the top housing rotates the lead screw within the lower housing to the desired volume dispensing position, and positions the lead screw to permit travel of the central shaft and for a predetermined travel distance following actuation of the actuator button.

6. The portable liquid dispensing device of claim 5, wherein the lead screw is rotatable between at least four positions.

7. The portable liquid dispensing device of claim 1, wherein the desired amount of liquid to be dispensed is adjustable between approximately 0.1 ml and 1.0 ml.

8. The portable liquid dispensing device of claim 1, wherein the liquid cartridge contains a prefilled desired liquid amount of at least approximately 10.0 ml.

9. The portable liquid dispensing device of claim 1 wherein the liquid cartridge contains a prefilled desired liquid amount of less than 10.0 ml.

10. The portable liquid dispensing device of claim 1, wherein an external case houses the portable liquid dispensing device and includes a viewing window for visually determining the amount of liquid remaining within the liquid cartridge.

11. The portable liquid dispensing device of claim 1, wherein an external case housing the portable liquid dispensing device is an interconnected two-piece housing having an opening in a top piece for slidably accessing the actuator button therethrough, and the top piece of the external case is engaged with the top housing, and the top piece of the external case is rotatable with respect to the interconnected lower piece, for similarly rotating the top housing with respect to the lower housing to the desired volumetric position where the volumetric indicia on the top and lower pieces are aligned for selecting the desired volume of liquid to be dispensed.

12. The portable liquid dispensing device of claim 1, wherein the liquid cartridge is disposable.

13. The portable liquid dispensing device of claim 1, wherein the portable liquid dispensing device is disposable.

14. The portable liquid dispensing device of claim 1, wherein the liquid cartridge is refillable and includes a removable end cap for engagement with an end of the liquid cartridge adjacent the second end of the central shaft and formed with the outlet for fluid exiting the device.

15. The portable liquid dispensing device of claim 2, wherein the central shaft has a first diameter portion engaged with the actuator button, lead screw and plunger assembly, and a second and narrower diameter portion sized for sliding engagement with an internal surface of the outlet, and a sealing tip is provided on the second end of the second and narrower diameter portion of the central shaft to engage and seal the outlet during retraction of the central shaft.

\* \* \* \* \*